May 9, 1967  G. PAPP  3,318,650
RADIATION DETECTION SYSTEM
Filed Sept. 19, 1960  7 Sheets-Sheet 1

Inventor:
George Papp.
by Gust & Orish
Attorneys.

May 9, 1967 G. PAPP 3,318,650
RADIATION DETECTION SYSTEM
Filed Sept. 19, 1960 7 Sheets-Sheet 2

Inventor:
George Papp,
by Hust & Irish
Attorneys.

May 9, 1967  G. PAPP  3,318,650
RADIATION DETECTION SYSTEM
Filed Sept. 19, 1960  7 Sheets-Sheet Inventor:
George Papp,
by Gust & Diehl
Attorneys.

United States Patent Office 3,318,650
Patented May 9, 1967

3,318,650
RADIATION DETECTION SYSTEM
George Papp, Fort Wayne, Ind., assignor to International Telephone and Telegraph Corporation
Filed Sept. 19, 1960, Ser. No. 56,847
11 Claims. (Cl. 350—6)

This invention relates generally to systems for detecting radiation emanating from a distant source, such as infrared radiation, and more particularly to radiation detection systems employing space filtering to distinguish signals responsive to small radiant targets from signals responsive to extended area radiant sources.

Infrared detection is frequently employed for passive (as opposed to radar) location of remote objects: in such systems, a mirror is commonly employed for scanning a field of view and reflecting radiation emanating therefrom onto an infrared detection device. In certain infrared detection systems, detection of small radiant targets, such as stars, airplanes, etc., is desired. However, it has in the past been difficult to distinguish such small targets from extended area radiation sources, such as clouds, bodies of water, etc. This is due to the fact that infrared detection devices typically provide a direct current output signal responsive to the radiation incident thereon. Thus, a large area ambient radiant source will provide an output signal level responsive thereto with a radiant target of interest within the large area source merely providing a momentary increase in the output signal level as the mirror scans the target. Such a system therefore requires wide band direct current amplifiers and threshold circuits for discriminating between the increased output signal level due to the target of interest and the output signal level due to background radiation. The background radiation level however varies with the source and thus, establishment of an arbitrary threshold signal level may eliminate signals due to targets of interest of low intensity, or pass signals due to background radiation of relatively high intensity thus obscuring a signal due to a target of interest. Another difficulty encountered in prior infrared detection systems is the fact that semi-conducting infrared detecting cells have an inherently high signal-to-noise ratio when constant radiation impinges thereon. However, the signal-to-noise ratio of such cells is frequency dependent, i.e., it decreases when the incident radiation is chopped or modulated with increased frequency.

It is therefore desirable to provide a radiation detection system in which signals due to extended radiation sources are suppressed without affecting signals from targets of small annular extension and it is further desirable that the signal-to-noise ratio be minimized.

It has been proposed to reduce the signal-to-noise ratio in infrared detection systems by chopping radiation impinging upon the detector cell at a convenient frequency with mechanical shutter. Furthermore, in such systems, a wide band alternating current amplifier of comparable bandwidth around the chopping frequency may be employed. However, in such systems, when the output signal is detected, the same problem of discrimination between background radiation and small radiant targets of interest is presented.

In the case of a mechanical scanner employing a rotating scanning mirror, it has been proposed that the radiation chopping be accomplished by the use of a reticle formed of parallel opaque and transparent bars. With this system, radiation reflected by the rotating mirror is scanned across the reticle as the mirror rotates. Here, radiation from an extended area source at all times passes through the spaces between the opaque bars of the reticle to impinge upon the detector thereby providing a resulting ambient direct current output signal level. However, a radiant image smaller than the opaque bars and transparent spaces therebetween when scanned across the reticle is chopped or intensity modulated at a particular frequency, thus superimposing an alternating current frequency component on the ambient direct current output signal level. This alternating current component may be amplified by an alternating current amplifier, thus discriminating between background radiation and radiant targets of interest; this method of suppressing signals due to extended area radiation sources while detecting signals from radiant targets of small annular extension is referred to as "space filtering."

To the best of the present applicant's knowledge, certain prior recticle space filtering arrangements employed a stationary reticle. With such a stationary reticle, the chopping frequency varies for targets of interest having different velocities and crossing angles, and also in response to changes in the scanning velocity due to tilting the mirror to scan a larger area. Other space filtering arrangements have employed a reticle rotating continuously but independently of the scanner. Such rotating reticle systems required separate drive motors for the reticle and the scanner and while the chopping frequency was increased due to rotation of the reticle, the chopping frequency was still subject to variation for targets having different velocities and crossing angles and due to tilting of the scanning mirror.

It is accordingly an object of my invention to provide a radiation detection system employing a scanning mirror and space filtering by means of a reticle in which the chopping frequency is uniform for every target point in the scanned field of view.

The foregoing object is accomplished in accordance with my invention by rotating the reticle in unison with the scanning mirror so that radiant images reflected by the mirror are scanned across the reticle bars at right angles thereto. In the preferred embodiment of my invention for large area scanning in which the mirror is tilted as well as rotated, the reticle is formed as a part of a meridian system and moved simultaneously with tilting of the mirror so that the spacing of the reticle bars is varied to compensate for changes in image velocities due to tilting of the mirror.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
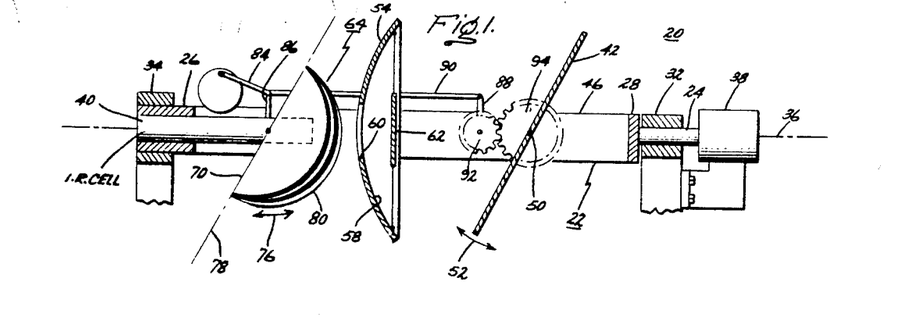
FIG. 1 is a side elevational view, partly in section, showing the preferred embodiment of my invention.
Figure 2:
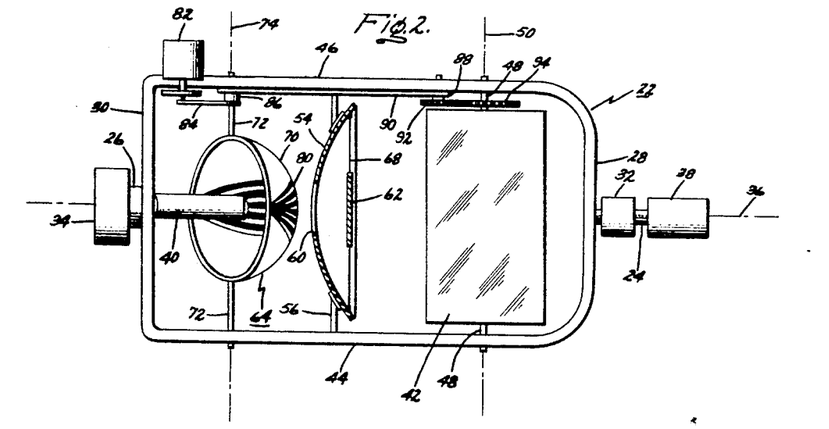
FIG. 2 is a top view, partly in section, further illustrating the apparatus of FIG. 1.

Turning now to FIGS. 1 and 2, there is shown radiation scanning apparatus, generally identified at 20, comprising a yoke 22 having shaft portions 24 and 26 respectively extending from its ends 28 and 30 and rotatably supported by suitable bearings 32 and 34 for rotation about axis 36, as shown. A suitable driving motor 38 is connected to shaft portion 24, as shown, fo rrotating yoke 22 about axis 36. Shaft portion 26 is hollow to accommodate radiation detection cell 40 on axis 36, as shown.

A flat scanning mirror 42 is provided pivotally mounted between sides 44 and 46 of yoke 22 by means of shaft 48 disposed on axis 50 perpendicular with respect to axis 36. It will thus be seen that mirror 42 rotates about axis 36 as yoke 22 is rotated and may also be tilted about axis 50 as shown by arrows 52. In order to reflect radiation from the field of view scanned by mirror 42 onto detector 40 and also to focus the reflected radiation onto a focal surface as described hereinafter, a spherical mirror 54 is provided disposed across axis 36 and supported from sides 44 and 46 of yoke 22, as at 56. The inner surface 58 of spherical mirror 54 is reflective and faces toward mirror 42; in the illustrated embodiment, the center of curvature of the inner surface 58 of spherical mirror 54 is coincident with axis 50, however, as will be pointed out hereinafter, the center of curvature of mirror 54 and tilting axis 50 of mirror 52 do not have to be coincident. Mirror 54 has a central opening 60 coaxial with axis 36 and a flat mirror 62 is provided extending across axis 36 between mirror 54 and mirror 42 for reflecting radiation received by mirror 54 from mirror 42 through opening 60 onto detector 40 and more particularly to focus the reflected radiation onto a spherical focal surface which, in the illustrated embodiment, is coincident with spherical reticle 64; as will be described hereinafter, the spherical focal surface which is coincident with reticle 64 has a radius of curvature one half the radius of curvature of inner surface 58 of mirror 54. In order properly to focus the reflected radiant image onto a spherical focal surface with which spherical reticle 64 is coincident, the center of curvature 66 of the spherical focal surface and the center of curvature 50 of mirror 54 must be equally spaced on opposite sides of mirror 62. In the illustrated embodiment, mirror 62 is supported from mirror 54, as at 68.

In accordance with the preferred embodiment of my invention, I provide a semi-spherical reticle supporting member 70 having reticle 64 thereon. Semi-spherical member 70, which may be formed of clear plastic material, is pivotally supported between sides 44 and 46 of yoke 22 by shaft 72 disposed on axis 74 which passes through center of curvature 66 of the spherical focal surface and which is coincident with an axis thereof; it will be observed that axis 74 is in the plane of axes 50 and 36 and is parallel with axis 50. Semi-spherical rectile supporting member 70 may thus be tilted about axis 74 as shown by arrows 76.

As will be described hereinafter, the reticle 64 formed on supporting member 70 is in the form of a portion of a meridian system about axis 78 of the spherical focal surface and semi-spherical supporting member 70, axis 78 being perpendicular to axis 74. Thus, the opaque bars 80 of reticle 64 have their widest spacing at the 90° point of the meridian system, merging to zero spacing at the poles of axis 78.

In accordance with my invention, supporting member 70 and reticle 64 are tilted simultaneously with tilting the scanning mirror 42, however, as will be described hereinafter, the meridian system forming reticle 64 is moved through an angle twice the tilting angle of movement of mirror 42 and in the negative direction, with the equator of the reticle meridian system being disposed on the axis 36 when mirror 42 is tilted at a 45° angle with respect to axis 36. To accomplish this simultaneous tilting of supporting member 70 of reticle 64, I provide a suitable driving motor 82 supported on side 46 of yoke 22 and having a connection with shaft 72 through link 84 and lever 86 attached to shaft 72. Thus, as motor 82 rotates, supporting member 70 and reticle 64 will be tilted or nodded through a predetermined angle depending upon the relative lengths of link 84 and lever 86. Another lever 88 is provided equal in length to lever 86 and connected thereto by link 90. Lever 88 is pivotally connected to side 46 of yoke 22 and is connected to drive gear 92, which in turn meshes with gear 94 connected to drive shaft 48 of mirror 42. Gear 94 has twice the number of teeth of gear 92 and it will be readily seen that mirror 42 will be tilted or nodded through an angle half the nodding angle of supporting member 70 and reticle 64 and in the opposite or negative direction.

Figure 3:
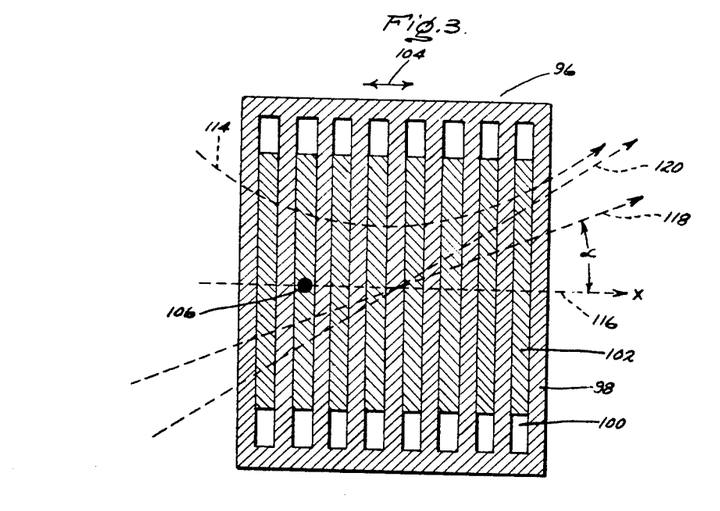
FIG. 3 shows a reticle and is useful in explaining my invention.

Referring now to FIG. 3, there is shown a reticle 96 formed of spaced parallel opaque bars 98, the transparent spaces 100 between bars 98 having the same width as the opaque bars 98. The face 102 of a radiation detection cell is shown behind reticle 96. It will now be readily comprehended that in the case of an extended area radiation image covering substantially all of reticle 96 and thus passing through each of the transparent spaces 100 onto face 102 of the detector, neither transverse movement of reticle 96 in the direction shown by arrows 104 nor rotation of the image responsive to rotation of the mirror will provide any appreciable effect upon the output signal of the cell 102 since radiation will at all times be impinging thereon. However, in the case of a small radiation image 106 having an extent no greater than the width of the transparent spaces 100 and opaque bars 98, transverse movement of reticle 96 in the direction 104 or movement of the radiant image due to rotation of the mirror will result in the radiant image 106 alternately being exposed to the face of cell 102 through spaces 100 and shielded therefrom by opaque bars 98 thus resulting in modulation of the output signal from the detector 102 at the frequency of chopping of the radiant image 106 by the opaque bars 98.

Figure 4:
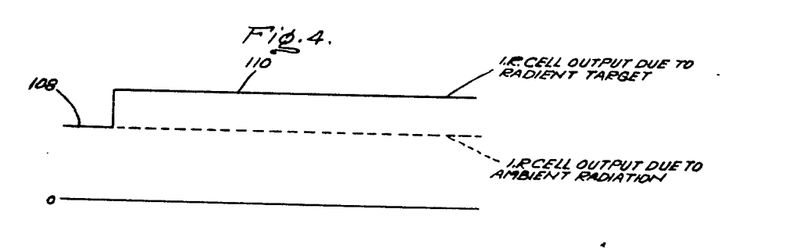
FIG. 4 shows the output signal characteristic of a radiation detector system which does not employ chopping of the radiation impinging upon the detection device.
Figure 5:
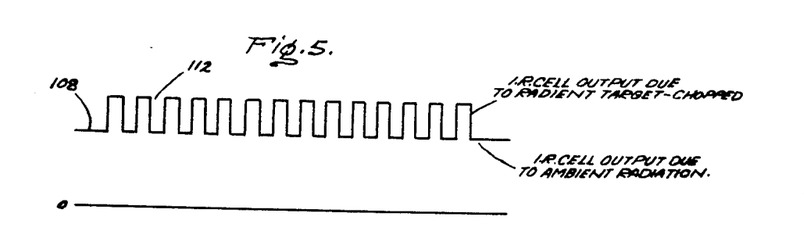
FIG. 5 shows the output signal characteristic provided with reticle chopping of the incident radiation.

Referring briefly to FIGS. 4 and 5, it will be seen that if no radiation chopping of any sort is provided, radiation from an extended area source impinging upon a radiation detector will provide an ambient direct current output signal level 108. A high intensity radiant spot surrounded by the background ambient radiation and coming into the field of view of the scanning system will provide an increased signal output level as at 110. However, with reticle chopping as described above in conjunction with FIG. 3, while an ambient output signal level 108 is provided in response to an extended area radiation source, chopping of a high intensity radiant spot by opaque bars 98 of reticle 96 provides an alternating current output signal 112 superimposed upon the ambient signal level 108, as shown in FIG. 5.

Returning now to FIG. 3, it will be seen that the radiant image 106 scanned by or across reticle 96 is modulated by a frequency $$f_0 = \frac{v_0}{1} \cos \alpha$$

where $v_0$ is the velocity of the image on the reticle, 1 is the periodicity interval of the reticle, and $\alpha$ is the angle between the direction of scanning and the $x$ axis, as seen in FIG. 3. It will thus be seen that as long as the velocity $v_0$ and the crossing angle of the radiant image 106 on the reticle 96 is constant, a constant chopping frequency $f_0$ will result. However, some image trajectories are curved, as shown at 114, resulting in a variation in the chopping frequency. If it is assumed that the radiant target 106 is initially travelling on a trajectory 116 crossing reticle 96 on the $x$ axis, as shown, tilting of the mirror to scan a larger area results in target 106 crossing the reticle along trajectories such as 118 and 120 inclined toward the $x$ axis, thus changing the angle $\alpha$ and thus the chopping frequency $f_0$ due to changing the scanning velocity $v_0$. It will now be comprehended that the image velocity on the reticle 96 is fastest when the tilting angle of the mirror is 45°, i.e., when the mirror 42 scans equatorial targets in a spherical field of view about axis 36, and that the image velocity is smallest when the scanning mirror 42 scans parallel circles about the poles of the spherical field of view about the axis 36, i.e., with tilting angles approaching zero or 90°. Thus, it will be seen that changes in both the target trajectory and the tilting angle of the mirror 42 result in a change in the chopping frequency $f_0$. It will now be comprehended, however, that the chopping frequency $f_0$ may be made constant if all target trajectories are caused to be at right angles to the reticle bars and if the spacing of the reticle bars is varied in accordance with the tilting angle of the mirror. Thus, in accordance with my invention, rotation of the reticle in unison with rotation of the mirror provides for scanning of the radiant images across the reticle bars at right angles and formation of the reticle as a meridian system and moving the same simultaneously with tilting of the mirror corrects for the changes in image velocities due to tilting of the mirror.

Figure 6:
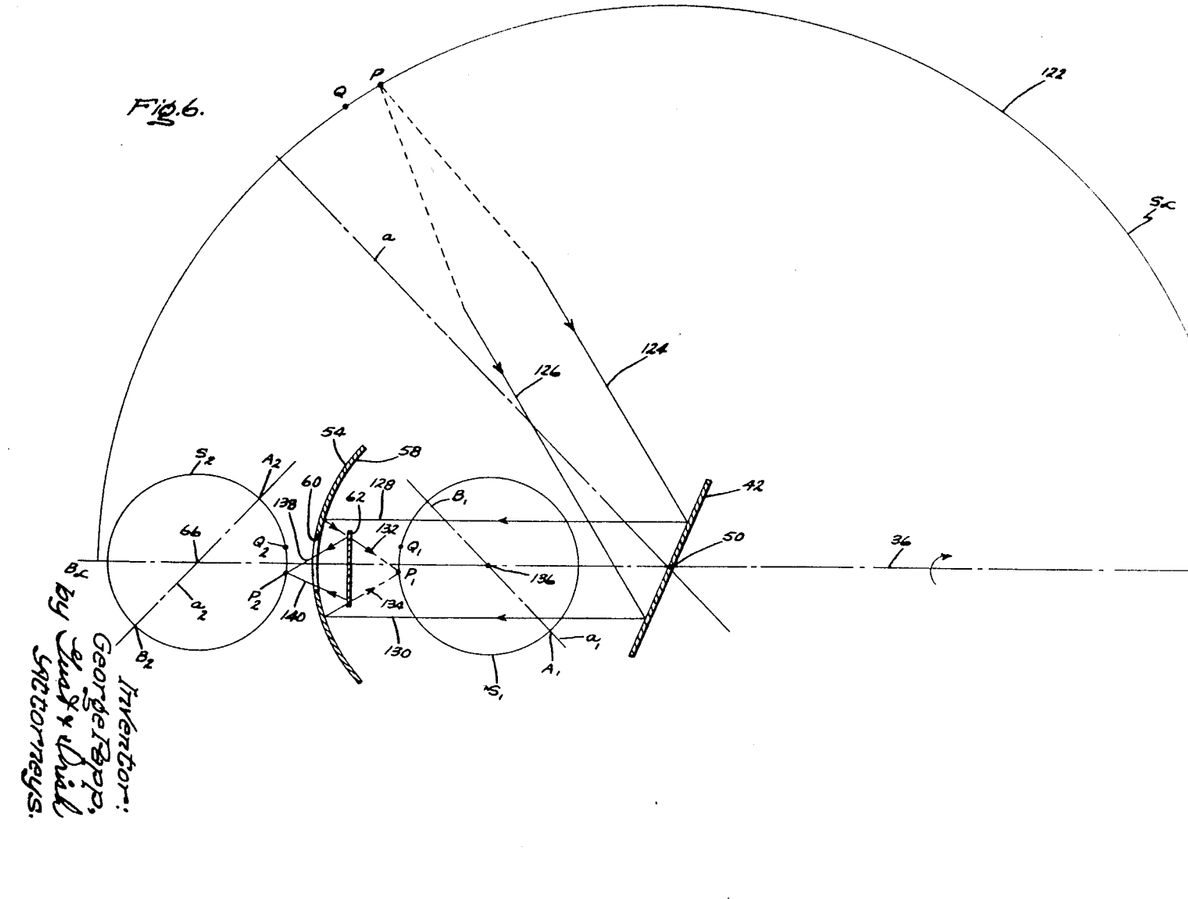
FIG. 6 is a diagram useful in explaining the preferred embodiment of my invention.

Referring now to FIG. 6, the field of view of mirror 42 when rotated about axis 36 and simultaneously tilted about axis 50 is an infinite sphere $S_z$ having poles $A_z$ and $B_z$ about axis 36 as shown. Considering now that the circle 122 is one meridian of infinite sphere $S_z$ extending between poles $A_z$ and $B_z$ about axis 36 and assuming that a target P is located on meridian 122, two light rays 124 and 126 are shown extending from target P and impinging upon mirror 42, it being assumed that target P is at an infinite distance so that light rays 124 and 126 are essentially parallel, and it further being comprehended of course that an infinite number of such parallel light rays extend from the target P to the mirror 42. The two light rays 124 and 126 are reflected by mirror 42 onto the inner reflective surface 58 of the spherical mirror 54, as at 128 and 130, and in the absence of flat mirror 62 would be in turn reflected by spherical mirror 54 as at 132 and 134 and focused at point P1 which falls on a spherical focal surface S1 having its center of curvature 136 coincident with the center of curvature 136 coincident with the center of curvature of reflective surface 58 of spherical mirror 54, but having half the radius. However, the presence of flat mirror 62 in turn reflects the image of target P through opening 60 of spherical mirror 54, as at 138 and 140, focusing the same at point P2 on spherical focal surface S2 having its center of curvature 66 spaced from mirror 62 by the same distance as the spacing of center of curvature 136 of focal surface S1, spherical focal surface S2 likewise having a radius of curvature half that of spherical mirror 54. It can be shown that all targets on the infinite spherical field of view $S_z$ of mirror 42 will be focused onto spherical focal surfaces S1 and S2 and thus another target Q on meridian 122 will be focused on spherical focal surface S1 at Q1 and onto spherical focal surface S2 at Q2. It will further be seen that the axis 36 will be mirrored by mirror 42 into axis $a$ which in turn is mirrored by spherical mirror 54 and mirror 62 into axes $a1$ and $a2$ of spherical focal surfaces S1 and S2 respectively. Thus, it can now be comprehended that a meridian system lying in the infinite spherical field of view $S_z$ extending through poles $A_z$ and $B_z$ about axis 36 (of which meridian 122 is a part) will be imaged onto spherical focal surface S1 as a meridian system about poles $A_1B_1$ on axis $a1$, and onto spherical focal surface S2 as a meridian system about poles $A_2B_2$ on axis $a2$. Likewise, a meridian system on spherical focal surface S2 about poles $A_2B_2$ will be imaged by mirrors 62, 54 and 42 into a meridian system on infinite spherical field of view $S_z$ about poles $A_z$ and $B_z$.

The foregoing discussion is in view of the fact that a description of the image trajectories on the reticle 64 of FIGS. 1 and 2 is a most difficult task and it is far simpler to describe the motion of the image of the reticle projected onto the sky.

Figure 7:
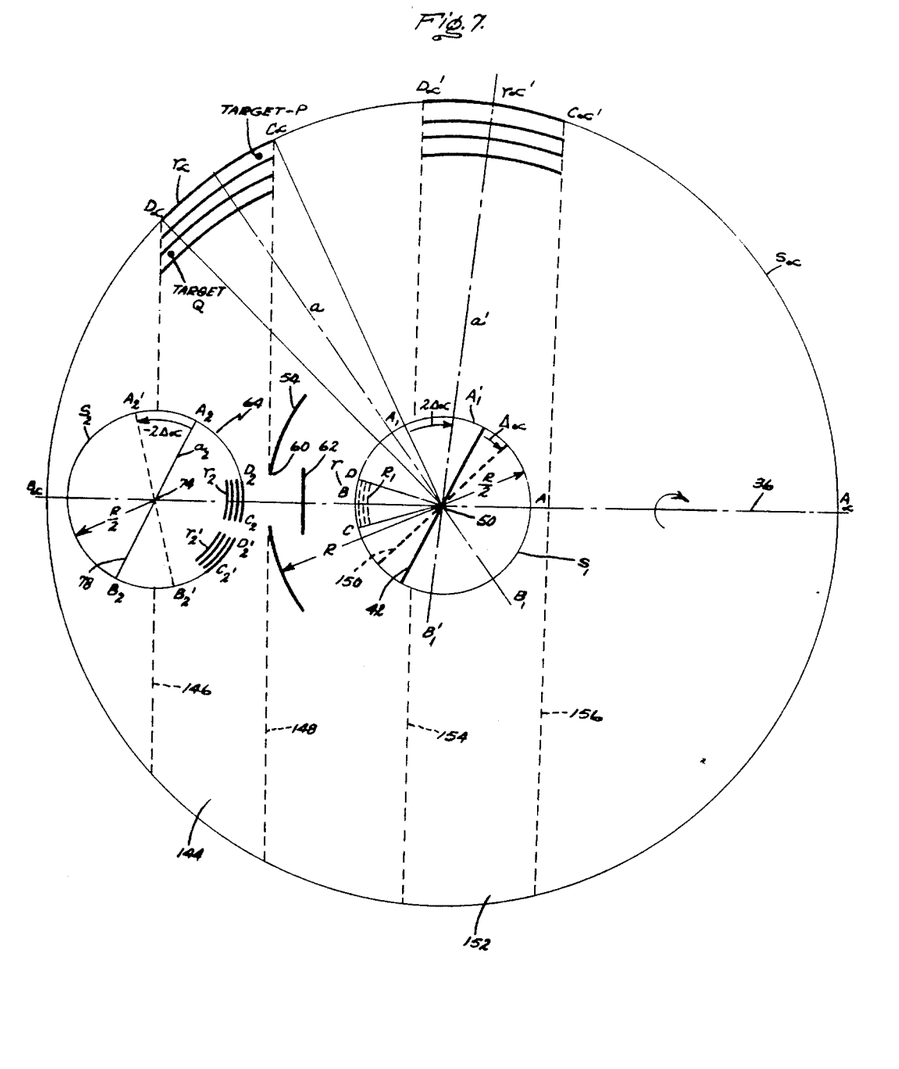
FIG. 7 is another diagram employed in explaining my invention.

Referring now additionally to FIG. 7, it will be seen that the positioning of mirror 42 along axis 36 with reference to the center of curvature 136 of spherical mirror 54 and spherical focal surface S1 is of no consequence and thus, in FIG. 7 along with FIGS. 1 and 2, mirror 42 is shown as having its pivotal axis 50 coincident with the center of curvature 136 of spherical mirror 54 and spherical focal surface S1, whereas FIG. 6 shows pivotal axis 50 of mirror 42 located at a distance from mirror 54 which is twice the radius of curvature of mirror 54; mirror 42 may be located anywhere along axis 36 since the light rays 128 and 130 reflected by mirror 42 toward spherical mirror 54 are always parallel with each other and parallel with axis 36.

Assuming now that while mirror 42 is in the position shown by solid lines in FIG. 7, a meridian system is provided on sphere S1 about poles $A_1B_1$ on axis $a$, i.e., the reflection of axis 36. Such a meridian system will be projected or reflected by mirror 42 into a corresponding meridian system from $A_z$ to $B_z$ on infinite spherical field of view $S_z$ about axis 36 with area CD of such meridian system on sphere S1 thus being projected into area $C_zD_z$ of the infinite sphere $S_z$. Thus, a reticle $r$ from C to D in sphere S1 with opaque bars coinciding with the lines of the meridian system from $A_1$ to $B_1$ will be projected into reticle $r_z$ from $C_z$ to $D_z$ on $S_z$, with the opaque bars again coinciding with the projection of the meridian system from $A_z$ to $B_z$. Rotation of the entire system, i.e., mirror 42 and reticle $r$ about axis 36 will carry reticle $r_z$ around in a segment 144 of infinite sphere $S_z$ between parallel circles 146 and 148 coaxial with axis 36.

The presence of mirror 62 of the folded mirror system produces the final image of the infinite spherical field of view $S_z$ on the identical but inverted sphere $S2$ which is the image of sphere S1. Thus, a meridian system from $A_2$ to $B_2$ on sphere $S_2$ will correspond to a meridian system from $A_1$ to $B_1$ on sphere S1 and in turn to the meridian system from $A_z$ to $B_z$ on the infinite sphere $S_z$. Thus, reticle $r2$ between C2 and D2 on sphere S2 with opaque bars coinciding with the meridian lines from $A_2$ to $B_2$ will be projected by means of flat mirror 62, spherical mirror 54, and mirror 42 into reticle $r_z$ between $C_z$ and $D_z$ on the infinite sphere $S_z$.

Assuming now a stationary target P on the infinite spherical field of view $S_z$ and within the spherical segment 144. As in the case of rotation of mirror 42 and reticle $r$, rotation of mirror 42 and reticle $r2$ in unison about axis 36 will carry projected reticle $r_x$ around spherical segment 144 about axis 36 so that the opaque bars of the projected reticle $r_x$ intercept target P, chopping the radiation emanating therefrom. If the bars of the reticle image $r_x$ are $\Delta\gamma$ in longitude apart, the frequency of modulation of the radiation emanating from target P is:

$$f_0 = \frac{\omega}{\Delta\gamma}$$

This is demonstrated by the fact that the time required to advance the bars of reticle $r_x$ by one bar, where T is the time for one complete rotation of the reticle is:

$$t = \frac{\Delta\gamma}{2\pi}T$$

Consequently, $t$ is the repetition interval of the radiation chopping for every target corresponding to the frequency $$f_0 = \frac{1}{t} = \frac{2\pi}{T\Delta\gamma} = \frac{\omega}{\Delta\gamma}$$

It will be observed that rotation of the projected reticle $r_x$ around the spherical segment 144 causes the opaque bars of the projected reticle $r_x$ to intercept all targets, such as P and Q, at right angles, one of the objectives of my invention.

Thus it is seen that with a reticle system formed of opaque bars coinciding with the lines of a meridian system about poles $A_2$ and $B_2$ on sphere S2, the segment $r2$ between C2 and D2 viewed by mirror 62 through window 60 of spherical mirror 54 can be said to be projected or imaged by spherical mirror 54 and mirror 42 into reticle $r_x$ on the infinite spherical field of view $S_x$ with rotation of reticle 64 and mirror 42 about axis 36 rotating the projected reticle $r_x$ through a segment 144 of the infinite spherical field of view $S_x$.

Now, if the mirror 42 is tilted about axis 50 from the position shown in the solid line to that shown in dashed lines 150 by an angle $\Delta\alpha$, it will be seen that the axis $a$ extending through poles $A_1 B_1$ on the sphere S1 which is the projection of axis 36, will rotate to $a'$ through poles $A_1' B_1'$ by angle $2\Delta\alpha$ and it will likewise further be seen that the corresponding axis $a2$ on the sphere S2 of poles $A_2 B_2$ rotates to $a2'$ between poles $A_2' B_2'$ by an angle $-2\Delta\alpha$. Thus, the meridian system on sphere S2 about poles $A_2$ and $B_2$ moves with the axis $a2$ into the new position $a2'$ about poles $A_2' B_2'$, however, the projection of the meridian system about poles $A_2' B_2'$ of sphere S2 is still a meridian system about poles $A_x B_x$ on the infinite sphere $S_x$, provided the equator of the meridian system of sphere S2 corresponds to a tilting angle of 45° of mirror 42 with reference to axis 36. Thus, the section of the reticle 64 viewed by mirror 62 through window 60 in mirror 54 also rotates around axis 74 so that reticle section $r2'$ between $C2'$ and $D2'$ is now projected by mirror 62, spherical mirror 54 and mirror 42 and to reticle $r_x'$ between $C_x'$ and $D_x'$ on the infinite spherical field of view $S_x$, rotation of reticle 64 and mirror 42 about axis 36 now carrying projected reticle $r_x'$ around a new spherical segment 152 between circles 154 and 156 coaxial with axis 36. Thus, reticle 64 on semi-spherical supporting member 70 coincident with spherical focal surface S2 with its opaque bars coinciding with a meridian system, as described, tilting about its axis 74 simultaneously with tilting of mirror 42 about its axis 50, but through twice the tilting angle of mirror 42 in the negative direction will result in a projection of a section of the reticle 64 viewed by mirror 62 through window 60 of spherical mirror 54 onto the infinite spherical field of view $S_x$ at every tilting and rotational position of the mirror 42. With such a system, rotation of reticle 64 and mirror 42 about axis 36 provides chopping of the radiant image of a target by the reticle bars exposed to window 60 of mirror 54 with a uniform modulation frequency $f_0$.

Figure 8:
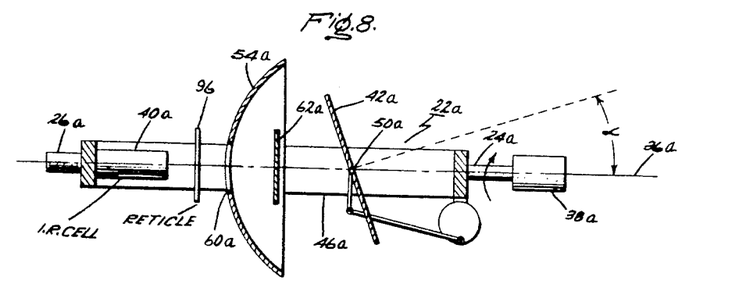
FIG. 8 is a side view, partly in section, illustrating a modification of my invention.

Referring now to FIG. 8 in which like elements are indicated by like reference numerals, for limited angle scanning, i.e., with the angle $\alpha$ of mirror 42 not being varied at all or being varied through a small angle, the flat reticle 96 of FIG. 3 with parallel opaque and transparent bars 98 and 100 may provide satisfactory results. Thus, in FIG. 8, reticle 96 is positioned transversely across axis 36a in a plane parallel with axis 50a of mirror 42a and perpendicular to axis 36a while being secured to sides 44a and 46a of yoke 22a so as to be rotated therewith about axis 36a by motor 38a. The images of distant radiant targets will still fall on a spherical focal surface S2 as described above and thus reticle 96 is preferably positioned at the intersection of the spherical focal surface S2 with axis 36a, i.e., with mirror 62a midway between axis 50a which, in the illustrated embodiment, is also the axis of curvature of mirror 54a and reticle 96. In this system, the projected image of the reticle does not coincide with the meridian system on the infinite spherical field of view $S_x$ about poles $A_x B_x$, however, at a tilting angle of 45° of mirror 42 with reference to axis 36a, the spacing of the projected reticle bars closely approximate that provided by the spherical reticle of FIGS. 1 and 2; as the tilting angle of mirror 42a deviates from 45° with reference to axis 36a, the spacing of the projected bars will become progressive larger than that provided by the spherical reticle and the modulation frequency consequently lower; the signal-to-noise ratio will correspondingly increase.

Figure 9:
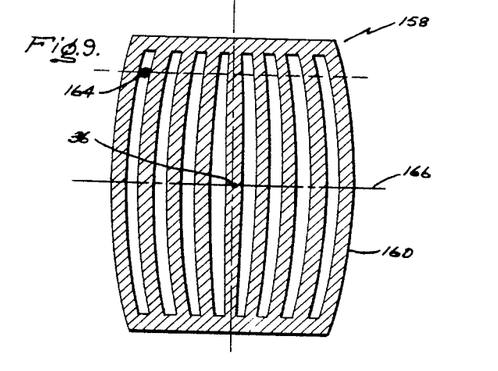
FIG. 9 is a view showing a modified form of reticle suitable for use in the embodiment of FIG. 8.

The uniformity of the chopping or modulation frequency provided by the embodiment of FIG. 8 employing a stationary reticle may be improved by the use of a reticle 158 as shown in FIG. 9 in which the spacing of the opaque bars 160 is wider along transverse line 166 intersecting axis 36 than at their ends. Thus, the opaque bars 160 of reticle 158 of FIG. 9 partially simulate a meridian system even though the reticle is not moved and thus a target 164 scanned across track 166 due to rotation of reticle 158 and mirror 42 about axis 36 will be chopped at a higher frequency due to closer spacing of the opaque bars 160 than would be the case if the opaque bars were evenly spaced.

Figure 10:
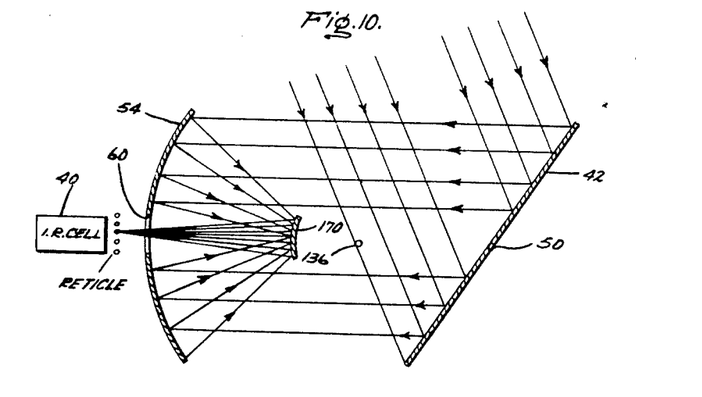
FIG. 10 is a view schematically showing a different form of lens system which may be employed with my invention.

Referring now to FIG. 10, in which like elements are still indicated by like reference numerals, while the folded mirror system of the previous figures is shown as employing a flat mirror 62 cooperating with spherical mirror 54 having center opening or window 60 therein, a more economical folded mirror system is a true Cassegrainian system in which a spherical mirror 170 is employed in lieu of the flat mirror 60. This permits positioning the mirror 170 closer to the center of curvature 136 of mirror 54 so that a mirror having a smaller diameter may be employed and a smaller window 60 provided in spherical mirror 54, in turn reducing the unused or shielded area of spherical mirror 54.

Figure 11:
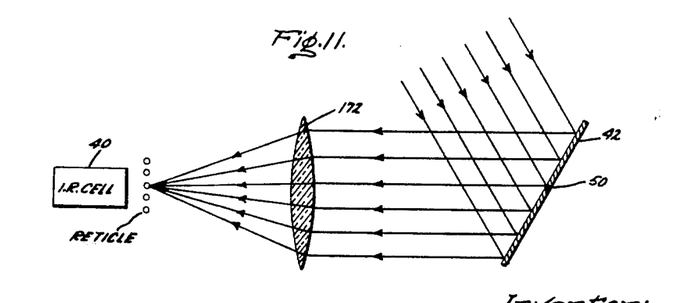
FIG. 11 is a view schematically showing another form of lens system which may be employed in my invention.

Referring now to FIG. 11, instead of the folded mirror system of the previous figures for focusing the radiant image onto a focal surface, a refracting optical system 172 may be employed in lieu of mirrors 54 and 62 or 170. Here, the radiant image reflected by mirror 42 from a radiant target on the infinite spherical field of view is again focused onto a spherical focal surface, however, the radius of such spherical focal surface is dependent upon the characteristics of the refracting optical system 172. However, the axis of a meridian system upon such spherical field of view is still tilted by an angle twice the angle through which the mirror 42 is tilted about axis 50 and in the negative direction.

Figure 12:
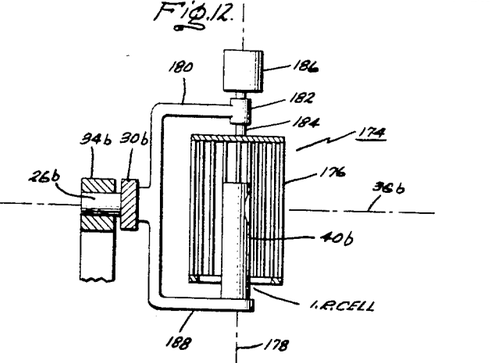
FIG. 12 is a fragmentary view, partly in section, illustrating another embodiment of my invention.

As indicated above in connection with a description of the embodiment of FIG. 8 employing a stationary flat reticle, a decrease in the chopping frequency as the tilting angle of the mirror departed from 45° results in an increase in the signal-to-noise ratio of the radiation detector. This situation may be improved by increasing the chopping frequency by the arrangement as shown in FIG. 12. Here, a reticle 174 in the form of a cylinder is employed with the opaque reticle bars 176 being evenly spaced around the periphery of the cylinder and extending longitudinally in a direction parallel to its axis 178. Reticle 174 is supported by means of a suitable bracket 180 secured to end 30b of yoke 22b so that the whole cylinder of reticle 174 is rotated about axis 36 as previously described. Here, however, bearing 182 on bracket 180 rotatably supports shaft 184 which in turn supports cylindrical reticle 174 with motor 186 on shaft 184 rotating cylindrical reticle 174 about its axis 178. As shown, radiation detector 40b is disposed within cylindrical reticle 174, being supported from end 30b of yoke 22b by another bracket 188. Thus, it will be seen that rotation of the entire cylindrical reticle 174 about axis 36b in unison with the rotation of mirror 42 provides the previously described scanning of radiant images across the opaque bars 176 in a direction perpendicular thereto, while simultaneous rotation of the reticle 174 about its axis 178 increases the chopping frequency responsive to the speed of rotation. This increased chopping frequency in turn provides substantial improvement in the signal-to-noise ratio of the radiation detector.

Figure 13:
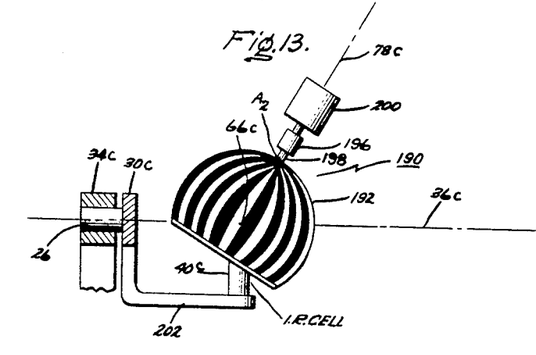
FIG. 13 is a side view, partly in section, illustrating the application of the embodiment of FIG. 12 to the preferred embodiment of my invention.
Figure 14:
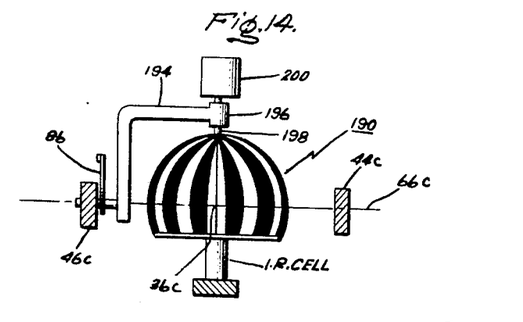
FIG. 14 is an end view, partly in section, of the embodiment of FIG. 13.

Referring now to FIGS. 13 and 14, there is shown an arrangement for increasing the chopping frequency provided by the embodiments of FIGS. 1 and 2 by rotating the spherical reticle about its axis 78. Here, spherical reticle 190 is provided in the form of a truncated sphere with its opaque bars 192 again forming a complete meridian system (with the exception of the truncated portion as clearly seen in FIGS 13 and 14) as opposed to the embodiment of FIGS 1 and 2 in which the reticle bars only form a narrow segment of a complete meridian system. Here, truncated spherical reticle 190 is rotatably supported about its axis 78c by a bracket 194 having bearing 196 rotatably supporting shaft 198 by which reticle 190 is supported, motor 200 in turn being attached to and rotating shaft 198 and reticle 190 about axis 78c. Bracket 194 is in turn rotatably supported on side 46c of yoke 22c about axis 66c, being tilted in the manner of the tilting of reticle 64 of FIGS. 1 and 2 by means of lever 86 driven by motor 82 through link 84. Radiation detector 40c in common with the embodiment of FIG. 12 is disposed within truncated spherical reticle 190 and is supported from end 30c of yoke 22c by means of a bracket 202. Thus, it will be seen that in the embodiment of FIGS. 13 and 14, the spherical reticle 190 with its opaque lines 192 forming a meridian system therin is tilted about axis 66c simultaneously with the tilting of gear 42c but through twice the angle and in the negative direction, and it is also simultaneously rotated about its axis 78c thereby to increase the chopping frequency as described above in connection with FIG. 12.

Figure 15:
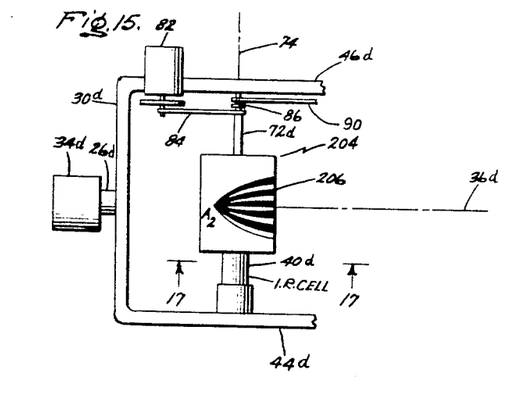
FIG. 15 is a top view illustrating a further embodiment of my invention.
Figure 16:
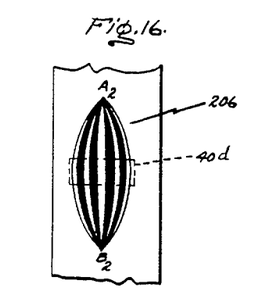
FIG. 16 is a view showing the developed reticle of FIG. 15.
Figure 17:
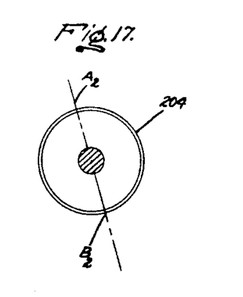
FIG. 17 is a view taken along the line 17—17 of FIG. 15.

Referring now to FIGS. 15 through 17, a chopping frequency having a uniformity closely approaching that provided by the embodiments of FIGS. 1 and 2 may be provided by providing a cylindrical reticle 204 having its opaque bars 206 forming a meridian system theron about poles $A_2$ and $B_2$. Here, cylindrical reticle 204 is rotatably supported by shaft 72d from side 46d of yoke 22 for rotation about axis 74. Rotation of cylindrical reticle 204 thereby to provide tilting of the reticle system 206 is again provided by means of lever 86 and link 84 driven by motor 82. It is thus seen that the tilting motion of poles $A_2B_2$ of cylindrical reticle 204 is identical to the tilting motion of the corresponding poles of the spherical reticle 64 of FIGS. 1 and 2.

Figure 18:
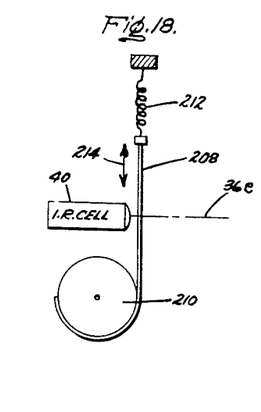
FIG. 18 is a fragmentary side view showing a modification of the embodiment of FIGS. 15 through 17.

Referring now to FIG. 18, the system of FIGS. 15 through 17 may be modified by providing a flat reticle 208 on a sheet of flexible material having opaque reticle bars thereon forming a meridian system about poles $A_2B_2$, as suggested in FIG. 16 which shows the developed form of the cylindrical reticle of FIGS. 15 and 17. Here, sheet 208 having the developed reticle 206 thereon has one end secured to a cylinder 210 and its other end resiliently secured by a suitable spring 212. Cylinder 210 is then rotated simultaneously with the tilting of mirror 42 thereby to move the developed reticle system 206 vertically up and down as shown by the arrows 214. Here, the physical length of the developed meridian system 206 may be as long as desired, however, in common with the previous figures, the equator, i.e., midway between the poles $A_2B_2$ of the meridian system 206 corresponds to a 45° tilting angle of mirror 42 and the reticle should be moved up or down by cooperation of cylinder 210 and spring 212 by an angular distance of the meridian system 206 corresponding to twice the angular tilting movement of mirror 42 in the negative direction.

Figure 19:
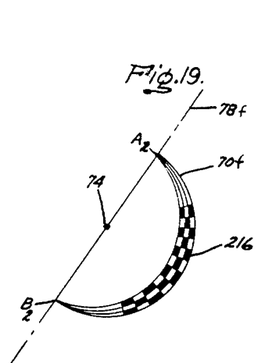
FIG. 19 is a fragmentary view showing yet another form of reticle useful with my invention.

Referring lastly to FIG. 19, the chopping frequency may also be increased without the necessity for rotating the reticle about the axis of its meridian system by providing a checkerboard reticle as shown. Here, the semispherical supporting member 70f of FIGS. 1 and 2 has opaque elements 216 thereon disposed in spaced apart relation in lines forming a meridian system about axis 78f. The checkerboard reticle system of FIG. 19 enhances the response of the system to targets of small angular extension providing a relatively high-frequency square-wave chopped radiation signal when a small image is scanned and a signal of relatively low amplitude when a target of large extension is scanned; the chopped square wave signal is rich in energy at the fundamental frequency associated with chopping but very little energy is available at this frequency when a target of large angular extent is scanned. Thus, by filtering the output of the detector to pass only the fundamental chopping frequency, undesirable targets are effectively eliminated.

While I have described above the principles of my invention in connection with specific apparatus, it is to be clearly understood that this description is made only by way of example and not as a limitation to the scope of my invention.

What is claimed is:

1. A radiation detection system comprising: radiation detection means disposed on a first axis for providing an output signal responsive to radiation incident thereon; a flat mirror on said first axis for receiving radiation from a distant source and for reflecting a radiant image of said source toward said detection means; means for rotating said mirror about said first axis whereby said mirror scans a segment of a spherical field of view about said first axis; a spherical shaped member disposed on said first axis in front of said detection means, the spherical surface thereof constituting a spherical focal surface, a reticle disposed on said spherical focal surface transversely across said first axis adjacent the intersection of said focal surface therewith and being formed of a plurality of opaque and transparent elements; reflecting means for directing a radiant image reflected by said mirror onto said detection means and for focusing said image onto said reticle; means for rotating said reticle about said first axis in unison with said mirror whereby a radiant image of a radiant spot in said segment is scanned across said reticle lines at right angles thereto and is given a pulsating characteristic by said opaque elements to provide an alternating current output signal.

2. The combination of claim 1 further comprising means for tilting said mirror about a second axis passing through said first axis and perpendicular thereto whereby said segment scanned by said mirror is rotated about said second axis.

3. The combination of claim 1 wherein said reticle is formed as at least a part of a sphere coextensive with said spherical focal surface with said lines forming a meridian system thereon about an axis thereof which crosses said first axis.

4. The combination of claim 1 wherein said reflecting means is a folded mirror system comprising a second mirror formed as part of a sphere disposed transversely across said first axis between said flat mirror and reticle and having its center of curvature on said first axis, said second mirror having its inner surface reflective and facing said flat mirror for receiving a radiant image reflected therefrom, said second mirror having a central opening concentric with said first axis, and a third mirror disposed transversely across said first axis between said second mirror and said flat mirror for receiving a radiant image reflected from said second mirror and reflecting the same through said central opening onto said detection means, said third mirror focusing said radiant image onto said focal surface.

5. The combination of claim 1 further comprising means for tilting said mirror about a second axis passing through said first axis and perpendicular thereto whereby said segment scanned by said mirror is rotated about said second axis; wherein said reticle in formed as at least a part of a sphere coextensive with said spherical focal surface with said lines forming a meridian system thereon about an axis thereof which lies in a first plane including said first axis and which is perpendicular to said second axis; wherein said detection means is exposed to a transverse segment of said reticle which is substantially less than the full length of said lines; and further comprising means for tilting said reticle about another axis thereof parallel with and in the plane of said second axis simultaneously with said tilting of said flat mirror with said first-named axis of said reticle moving in said first plane through an angle twice the angle of movement of said flat mirror in the negative direction thereby to change the spacing of said lines in the segment exposed to said detection means proportional to the change in radiant image velocities due to said tilting of said mirror whereby said alternating current output signal has a uniform frequency, said meridian system having its equator corresponding to an angle of said flat mirror of 45° with respect to said first axis.

6. The combination of claim 1 wherein said reticle is formed as at least a part of a sphere coextensive with said spherical focal surface with said lines forming a meridian system thereon about an axis thereof which crosses said first axis; and wherein said reflecting means is a folded mirror system comprising a second mirror formed as part of a sphere disposed transversely across said first axis between said flat mirror and reticle and having its center of curvature on said first axis, said second mirror having its inner surface reflective and facing said flat mirror for receiving a radiant image reflected therefrom, said second mirror having a central opening concentric with said first axis, and a third mirror disposed transversely across said first axis between said second mirror and said flat mirror for receiving a radiant image reflected from said second mirror and reflecting the same through said central opening onto said detection means, said reticle having half the radius of curvature of said second mirror, the center of curvature of said reticle being on the side thereof remote from said second mirror, said third mirror being positioned substantially midway between the centers of curvature of said reticle and second mirror whereby said third mirror focuses said radiant image onto said focal surface.

7. The combination of claim 1 wherein said reticle is frusto-spherical in form coextensive with said spherical focal surface with said lines forming a meridian system thereon about an axis thereof which crosses said first axis perpendicularly, wherein said detection means is disposed within said reticle; and further comprising means for rotating said reticle about its said axis thereby to increase the frequency of said output signal.

8. A radiation detection system comprising radiation detection means for providing an output signal responsive to radiation incident thereon, means including a mirror for receiving radiation from a distant source and for reflecting the radiant image of said source along a path onto said detection means; means including a reticle disposed across said path of reflected radiation between said detection means and said mirror, said reticle being formed of a plurality of opaque and transparent elements in the form of a checkerboard pattern; means for rotating said mirror about the axis of said path whereby said mirror scans a segment of a spherical field of view, and means for simultaneously imparting a tilting motion to said mirror about another axis at right angles to said axis of said path whereby said segment of a spherical field of view scanned by said mirror is rotated about both axes whereby said mirror scans said spherical field of view; said means for rotating said mirror about the axis of said path also rotating said reticle in unison with said mirror about the axis of said path whereby a radiant image reflected by said mirror onto said detection means from a radiant spot in said segment is scanned across said reticle elements at right angles thereto and is given a pulsating characteristic thereby to provide an alternating current output signal at a substantially constant frequency.

9. A radiation detection system comprising: radiation detection means for providing an output signal responsive to radiation incident thereon; means including a mirror for receiving radiation from a distant radiant source and for reflecting a radiant image of said source along a path onto said detection means; means including a reticle disposed transversely across said path of reflected radiation between said detection means and said mirror, said reticle being formed of a plurality of opaque and transparent elements in longitudinal lines; means for rotating said mirror about the axis of said path whereby said mirror scans a segment of a spherical field of view about said axis; means for rotating said reticle in unison with said mirror about the axis of said path whereby a radiant image reflected by said mirror onto said detection means from a radiant spot in said segment is scanned across said reticle lines at right angles thereto and is given a pulsating characteristic by said elements to provide an alternating current output signal; means for simultaneously imparting a tilting motion to said mirror through a predetermined angle with reference to its rotational axis about a second axis at right angles thereto wehreby the segment scanned by said mirror is rotated about said second axis; said reticle lines forming at least a part of a meridian system about a third axis crossing the rotational axis of said reticle; said detection means being exposed to a transverse segment of said reticle which is substantially less than the full length of said lines; and means for moving said reticle simultaneously with said tilting motion of said mirror whereby said reticle moving means moves said meridian part through an angle twice said predetermined angle in the neagtive direction, said meridian system having its 90° point corresponding to an angle of said flat mirror of 45° with respect to its rotational axis thereby to change the spacing of said lines in the segment exposed to said detection means proportional to the change in radiant image velocities due to said tilting motion of said mirror whereby said alternating current output signal has a uniform frequency.

10. A radiation detecting system comprising: radiation detection means disposed on an axis for providing an output signal responsive to radiation incident thereon; a flat mirror for receiving radiation from a distant source and for reflecting a radiant image of said source toward said detection means; means for rotating said mirror about said axis whereby said mirror scans a segment of a spherical field of view about said axis; means for directing a radiant image reflected by said mirror onto said detection means and for focusing said image onto a focal surface in front of said detection means; a reticle disposed transversely across said axis adjacent the intersection of said focal surface therewith and being formed of a plurality of longitudinal opaque and transparent bars and said reticle is formed as a cylinder having its axis perpendicular to said first-named axis, said bars being in spaced parallel relationship around said cylinder and parallel with said cylinder axis, and wherein said detection means is within said cylinder; and further comprising means for simultaneously rotating said cylinder about its axis thereby to increase the frequency of said output signal; and means for rotating said reticle about said axis in unison with said mirror whereby a radiant image of a radiant spot in said segment is scanned across said reticle bars at right angles thereto and is given a pulsating characteristic thereby to provide an alternating current output signal.

11. A radiation detecting system comprising: radiation detection means disposed on an axis for providing an output signal responsive to radiation incident thereon; a flat mirror for receiving radiation from a distant source and for reflecting a radiant image of said source toward said detection means; means for rotating said mirror about said axis whereby said mirror scans a segment of a spherical field of view about said axis; means for directing a radiant image reflected by said mirror onto said detection means and for focusing said image onto a focal surface in front of said detection means; a reticle disposed transversely across said axis adjacent the intersection of said focal surface therewith and being formed of a plurality of longitudinal opaque and transparent bars and said reticle is formed as a cylinder having its axis perpendicular to said first-named axis, said bars forming a part of a meridian system about an axis, said bars being disposed circumferentially on said cylinder with said meridian system axis extending through the cylinder axis and perpendicular thereto; and said detection means is within said cylinder and exposed to a transverse segment of said bars substantially less than the full length of said bars; means for tilting said mirror about an axis parallel with and lying in a plane with the cylinder axis whereby said segment scanned by said mirror is rotated about the axis of tilting; means for simultaneously rotating said reticle about the cylinder axis through an angle twice the angle of movement of said mirror and in the negative direction thereby to change the spacing of said bars in the segment exposed to said detection means proportional to the change in radiant image velocities due to said tilting of said mirror, said meridian system having its equator corresponding to an angle of said mirror of 45° with respect to said first-named axis; and means for rotating said reticle about said axis in unison with said mirror whereby a radiant image of a radiant spot in said segment is scanned across said reticle bars at right angles thereto and is given a pulsating characteristic thereby to provide an alternating current output signal having a uniform output frequency.

References Cited by the Examiner

UNITED STATES PATENTS

| | | | |
|---|---|---|---|
| 2,336,379 | 12/1943 | Warmisham | 88—32 |
| 2,425,541 | 8/1948 | Konet | 88—1 |
| 2,670,656 | 3/1954 | Braymer | 88—32 |
| 2,682,197 | 6/1954 | Davis | 88—32 |
| 2,730,926 | 1/1956 | Back | 88—32 X |
| 2,858,453 | 10/1958 | Harris | 88—23 X |
| 2,878,396 | 3/1959 | Behm et al. | 250—233 |
| 2,947,872 | 8/1960 | Carbonara et al. | 250—203 |
| 2,967,247 | 1/1961 | Turck | 250—203 |
| 2,975,289 | 3/1961 | Robert | 250—203 |
| 2,981,842 | 4/1961 | Kaufold et al. | 250—203 X |
| 2,997,595 | 8/1961 | Cary et al. | 250—203 |
| 3,007,053 | 10/1961 | Merlen | 250—203 |
| 3,023,661 | 3/1962 | McClusky et al. | 250—203 X |

FOREIGN PATENTS

| | | |
|---|---|---|
| 1,149,437 | 7/1957 | France. |

JEWEL H. PEDERSEN, *Primary Examiner.*

ARTHUR M. HORTON, BENJAMIN A. BORCHELT, SAMUEL FEINBERG, *Examiners.*

W. J. NELSON, P. G. BETHERS, V. R. PENDEGRASS, R. L. WIBERT, *Assistant Examiners.*